UNITED STATES PATENT OFFICE.

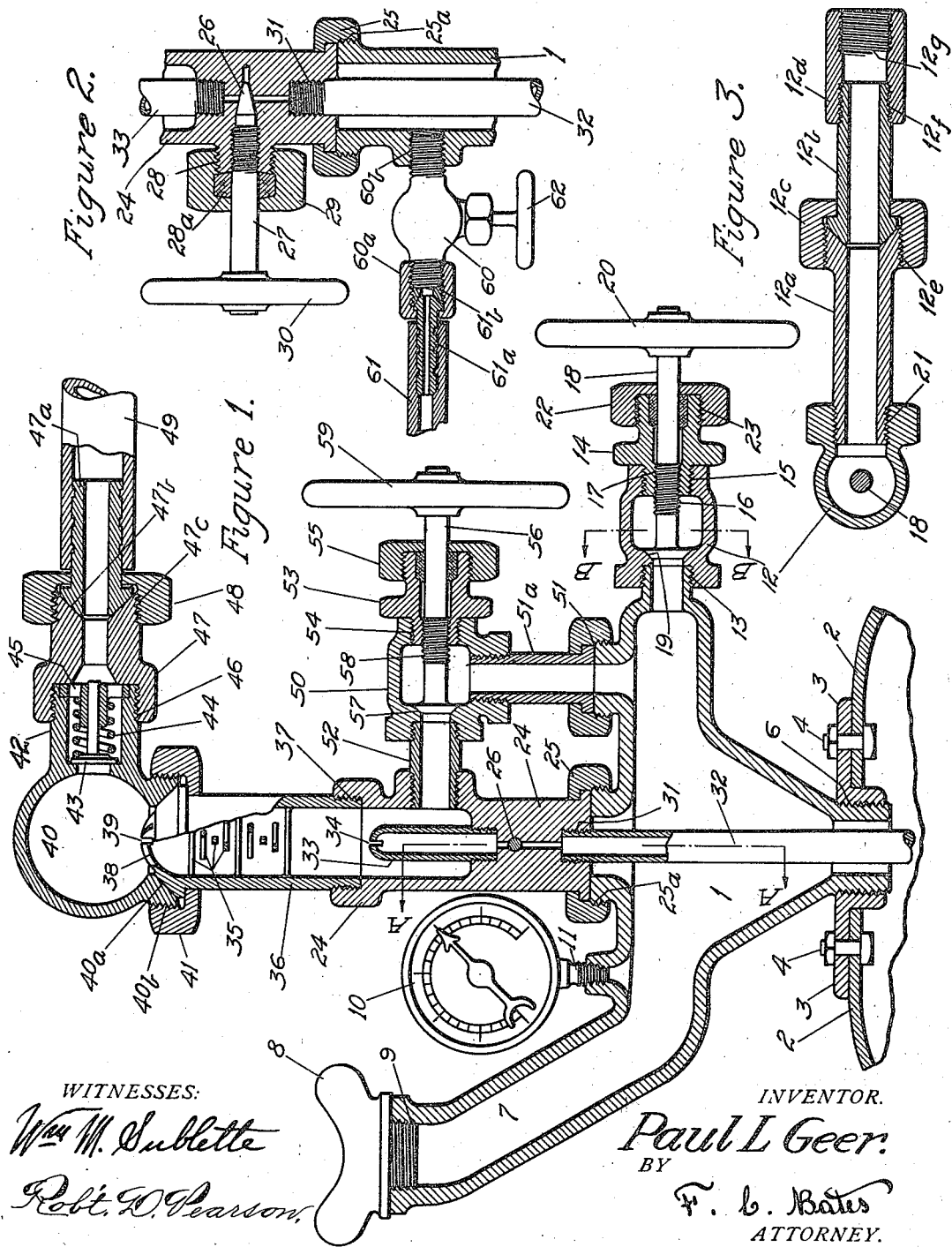

PAUL L. GEER, OF SAN JOSE, CALIFORNIA.

FUEL-OIL OUTSIDE ATOMIZER.

1,235,678.  Specification of Letters Patent.  Patented Aug. 7, 1917.

Application filed November 1, 1916. Serial No. 128,920.

*To all whom it may concern:*

Be it known that I, PAUL L. GEER, a citizen of the United States, and a resident of San Jose, in the county of Santa Clara and State of California, have invented a certain new and useful Improvement in Fuel-Oil Outside Atomizers, of which the following is a specification.

My invention relates to an improvement in fuel oil outside atomizers, and the objects of my invention are:

First, to produce a fuel oil out-side atomizer that can be attached to the out-side of a fuel oil tank, and one that will produce a combustible vapor without heating said fuel oil.

Second, to so construct a fuel oil out-side atomizer whereby the air pressure required will be equal to the pressure required upon the fuel oil.

Third, to so construct a fuel oil out-side atomizer that will produce any required richness of vapor under the same air pressure.

Fourth, to so construct a fuel oil out-side atomizer that will produce a vapor by adjustment equal to the heat or work required of the same.

I accomplish these objects by means of the atomizer illustrated in the accompanying drawings, in which:

Figure 1 is a detail sectional view showing means of attaching the atomizer to the out-side of an oil fuel tank with air feed pipes and oil feed pipes in position.

Fig. 2 is a sectional view on line A—A of Fig. 1 of my fuel oil out-side atomizer showing position of feed needle valve, and auxiliary air valve.

Fig. 3 is a sectional view on line B—B of Fig. 1 of my fuel oil out-side atomizer showing position of inlet air valve casing with connections leading thereto.

In the accompanying drawings similar reference numerals refer to similar parts.

Referring now to the drawing, my improved fuel oil out-side atomizer consists of a main casing 1; this casing may be made of any suitable metal required and of any size desirable and of the proper thickness to retain the air pressure required to operate said atomizer. Said casing 1 being fastened to oil pressure tank 2 by flange plate 3, said flange plate 3 being fastened to oil pressure tank 2 by bolts 4, said flange plate 3 is shown threaded at 6 to receive casing 1, adapted to connect said atomizer to any oil fuel pressure tank having said flange plate 3 fastened thereto. I have here shown oil filling projection 7 which is an integral part of casing 1 having a plug cap 8 fitted thereto by threaded portion 9.

Air pressure gage is shown at 10 connected to casing 1 by pipe fittings 11, said air pressure gage being adapted to designate the air pressure in said casing 1 and said oil pressure tank 2. Inlet air valve casing is shown at 12, connected to casing 1 by threaded portion 13; releasing cap is shown at 14 connected to said valve casing 12 by threaded portion 15, said releasing cap being for the purpose of removing said valve from said casing when so required, valve stem 18 being threaded at 16, adapted to engage the threaded portion 17 for the purpose of operating air valve 19 by hand wheel 20. Air pressure hose connections are connected to air valve casing 12 by the threaded portion 21 leading from an air tank not shown.

Packing nut is shown at 22, connected to releasing cap 14 by threaded portion 23, adapted to prevent any leakage around said valve stem 18 when the air pressure is applied to air valve casing 12. Union joint pipe is shown at $12^a$ connecting with union joint pipe $12^b$, by union joint coupling nut $12^c$ by threaded portion $12^e$, hose coupling sleeve $12^d$ being connected to union joint pipe $12^b$ by threaded portion $12^f$, threaded portion $12^g$ leading to hose connection not shown. Oil needle valve casing 24 is shown connected to casing 1 by union joint nut 25, needle valve seat 26 being an integral part of said casing 24 to which is attached needle valve and stem 27, as shown in Fig. 2, the same having a stuffing box $28^a$, and a packing nut 29, connected to said casing 24 by threaded portion 28 to prevent any leakage around said valve stem 27 when the oil under pressure is applied thereto; said valve and stem 27 being operated by hand wheel 30, as to the amount of oil required. Connected to said needle valve casing 24 by threaded portion 31 is oil feed pipe 32 leading down into oil pressure tank 2, a distance through which is fed fuel oil under pressure to needle valve 26. Connected to the inner portion of casing 24, is oil pipe nozzle 33, connecting with needle valve 26 in said casing 24, said nozzle having cross slots cut in the upper end thereof at 34, adapted to deliver oil under pressure to a plurality of baffle plates 35. In baffle plate chamber 36, said baffle plates 35 assist greatly in vaporizing the mixture as the same passes therethrough under pressure, said baffle plates being an integral part of casing 36, said casing 36 being connected to casing 24 by threaded portion 37, the upper and inner portion of casing 36 being rounding in shape as shown at 38, having cross slots 39 in the upper side thereof, adapted to allow the gas vapor to pass therethrough under pressure from baffle plates 35 to vapor chamber 40, said vapor chamber 40 being connected to casing 36 by union joint nut 41. Outlet of vapor chamber 40 is shown at 42 in which is placed outlet check valve 43, said valve being held in place by spring 44 and adjustable guide cross bar 45, said outlet check valve spring 44 being adapted to close said valve 43 when pressure in vapor chamber 40 drops below a predetermined point. Connected to vapor chamber outlet 42 by threaded portion 46 is hose coupling 47. Union joint coupling nut 48 is connected to said hose coupling 47 by threaded portion 47$^c$, connecting union joint 47$^b$, union joint nipple 47$^a$ being adapted to receive hose 49, leading to any vapor oil burner or to any other suitable connection where the atomized vapor may be required.

Air feed controlling valve casing 50 is shown connecting with casing 1 by union joint 51 and pipe 51$^a$, and with casing 24 by pipe 52. Releasing cap of said valve casing 50 is shown at 53 connected to said valve casing 50 by threaded portion 54. Connected to the outer end of said releasing cap 53 is packing nut 55. This packing nut is for the purpose of preventing any leakage around valve stem 56 while under pressure. Air mixing valve is shown at 57, the same being an integral part of valve stem 56, the same being operated by threaded portion 58, and hand wheel 59 attached to valve stem 56.

Auxiliary air valve is shown at 60 connected to casing 1 by threaded portion 60$^b$, and operated by hand wheel 62, the outer portion of said valve 60 being connected to hose nipple 61$^a$ by coupling nut 60$^a$ and threaded portion 61$^b$, hose nipple 61$^a$ being adapted to receive hose 61, said hose 61 leading to any vapor oil burner or to any other suitable connection where the auxiliary air may be required.

The operation of my fuel oil out-side atomizer is as follows: Oil is admitted to tank 2 through oil filling projection 7 by removing plug cap 8. When tank 2 is filled to the required amount, air is admitted to tank 2 through air valve 19 to the required pressure shown by gage 10, air being controlled through valve 19 by out-side control 20 to casing 1 and tank 2. Oil is admitted to pipe nozzle 33 through needle oil valve 26, the same being operated by hand wheel 30 on the out-side of oil needle valve casing 24. By the manipulation of said oil valve 26 and air valve 57 any required mixture of oil and air vapor may be produced in vapor chamber 40, and delivered therefrom through outlet check valve 43 to hose 49 for any purpose required.

Having thus described my invention, what I claim as new and desire to secure by Letters Patent, is:

1. In a fuel oil out-side atomizer the combination of a main casing adapted to retain an air pressure, a flange plate, adapted to connect said atomizer to an oil and air tank, a filling projection which is an integral part of said main casing, an opening in said filling projection, a plug cap in said filling projection, adapted to close said opening against pressure, an air pressure gage, said air pressure gage being adapted to designate the air pressure in said casing and in said oil and air tank connected therewith, an inlet air valve casing, an air valve, a releasing cap connected to said inlet air valve casing, adapted to remove said air valve from said casing when so required, a packing nut connected to said releasing cap adapted to prevent any leakage around said inlet air valve stem when under pressure, means by which said inlet air valve casing is connected to said main casing, substantially as shown and described.

2. In a fuel oil out-side atomizer the combination of a main casing adapted to retain an air pressure, a flange plate adapted to connect said atomizer to an oil and air tank, a filling projection, the same being an integral part of said main casing, an opening in said filling projection, a plug cap in said filling projection adapted to close said opening against pressure, an air pressure gage, an oil needle valve casing, an oil needle valve seat in said casing which is an integral part thereof, a needle valve and stem connected to said needle valve seat, a packing nut adapted to prevent any leakage around said needle valve stem when the oil is under pressure, an oil feed pipe, said oil feed pipe connecting with said oil needle valve seat in said oil needle valve casing adapted to supply oil under pressure to said needle valve, an oil pipe nozzle, said oil pipe nozzle connecting with said needle valve in said needle valve casing, cross slots cut in the upper end of said oil pipe nozzle, adapted to deliver oil under pressure therethrough, a casing connected to said needle valve casing, a plurality of baffle plates in said baffle plate casing which are an integral part of said casing, said oil pipe nozzle being adapted to deliver oil under pressure to said baffle plates in said baffle plate casing, cross slots in the upper end of said casing adapted to allow the gas vapor to pass therethrough from said baffle plates under pressure, a vapor chamber, said vapor chamber being connected to said baffle plate casing adapted to receive the oil and air vapor from said baffle plates, an outlet check valve, a spring adapted to close said valve to its seat when pressure in vapor chamber drops below a predetermined point, an adjustable guide cross bar adapted to retain said valve in working position, an outlet in said vapor chamber in which said outlet check valve operates, a hose coupling connected to said outlet, a hose connected to said coupling, substantially as shown and described.

3. In a fuel oil out-side atomizer the combination of a main casing, a flange plate, an oil filling projection which is an integral part of said main casing, an opening in said filling projection, a plug cap in said filling projection adapted to close said opening against pressure, an air pressure gage, an inlet air valve casing, an inlet air valve, and means for operating the same, an oil needle valve casing, an oil needle valve seat in said casing, a needle valve connected thereto, and means for operating the same, an air mixing valve casing, an air mixing valve positioned in said casing, and means for operating said valve in said casing, an auxiliary air valve in said main casing adapted to deliver air to any oil vapor burner or to any other suitable connection where the auxiliary air may be required, means for operating said auxiliary air valve, substantially as shown and described.

In testimony whereof I have hereunto affixed my signature in presence of two subscribing witnesses.

PAUL L. GEER.

Witnesses:
S. M. BATES,
ROBT. D. PEARSON.